T. A. C. BOTH.
SOCKET SHELL.
APPLICATION FILED MAY 2, 1911.

1,024,671.

Patented Apr. 30, 1912.

3 SHEETS—SHEET 1.

WITNESSES
H. Citcheson
R. Menk

INVENTOR
Tonjes A. C. Both
BY
Alan M. Johnson
ATTORNEY

T. A. C. BOTH.
SOCKET SHELL.
APPLICATION FILED MAY 2, 1911.
1,024,671.
Patented Apr. 30, 1912.
3 SHEETS—SHEET 2.
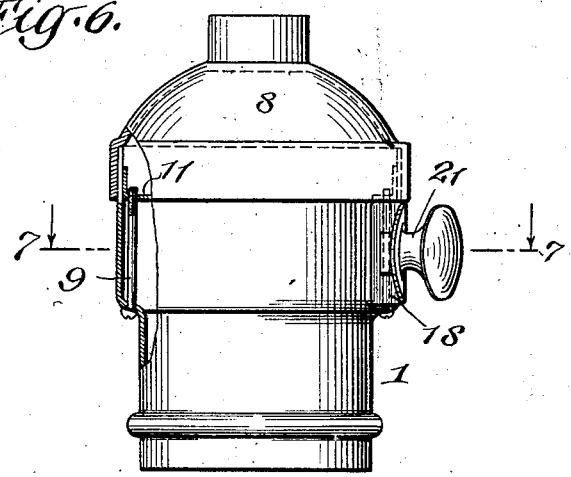
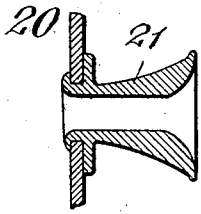
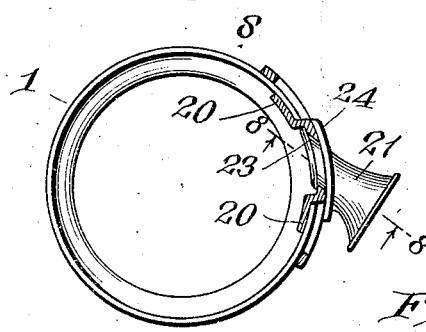
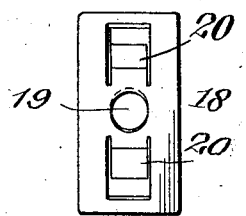
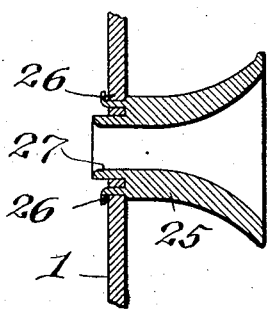
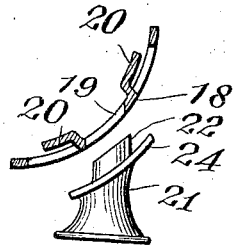
WITNESSES
INVENTOR
Tonjes A. C. Both
BY
Alan M. Johnson
ATTORNEY T. A. C. BOTH.
SOCKET SHELL.
APPLICATION FILED MAY 2, 1911.
1,024,671.
Patented Apr. 30, 1912.
3 SHEETS—SHEET 3.
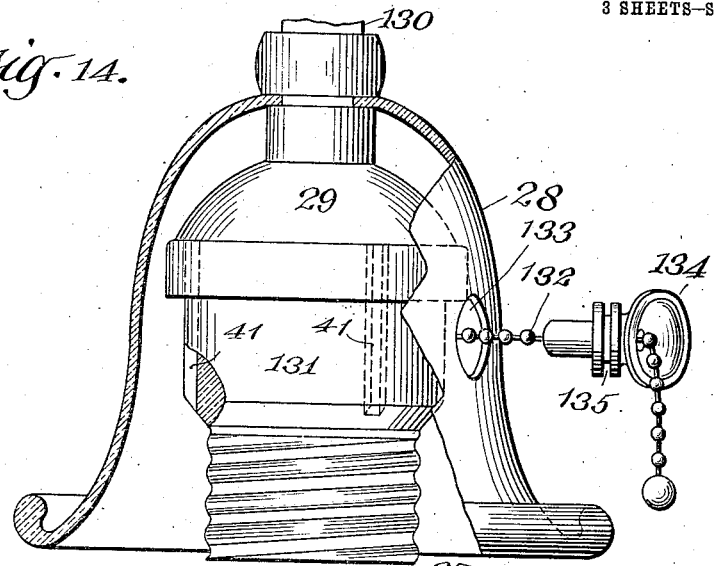
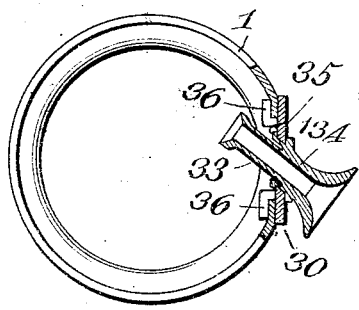
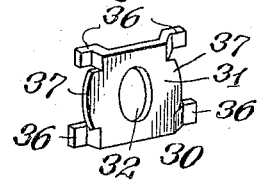
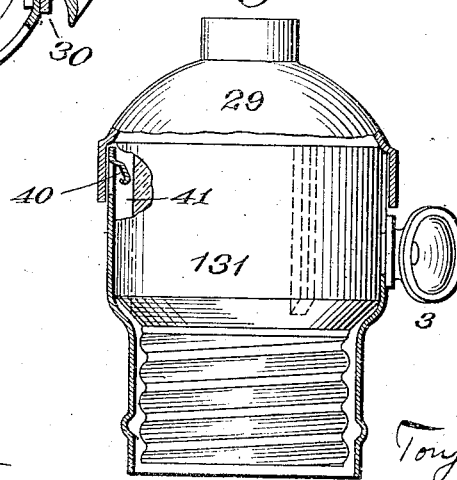
WITNESSES
H. Crocker
R. Menk
INVENTOR
Torgest C. Both
BY
Alan M. Johnson
ATTORNEY

UNITED STATES PATENT OFFICE.

TONJES AUGUST CARL BOTH, OF NEW YORK, N. Y., ASSIGNOR TO IDA S. ROSENHEIM, OF NEW YORK, N. Y.

SOCKET-SHELL.

1,024,671.  Specification of Letters Patent.  Patented Apr. 30, 1912.

Application filed May 2, 1911. Serial No. 624,554.

*To all whom it may concern:*

Be it known that I, TONJES AUGUST CARL BOTH, a citizen of the United States, and a resident of New York, in the county of New York and State of New York, have invented certain new and useful Improvements in Socket-Shells, of which the following is a specification, taken in connection with the accompanying drawings, which form a part of the same.

This invention relates to electrical apparatus and more particularly to socket shells and means for securing a cap and socket shell together; and further relates to a detachable chain guide, both as an article of manufacture and in combination with a shell and cap which hold it in its proper position.

My invention further relates to certain details of construction which will be more fully described in the specification and pointed out in the claims.

Figure 1:
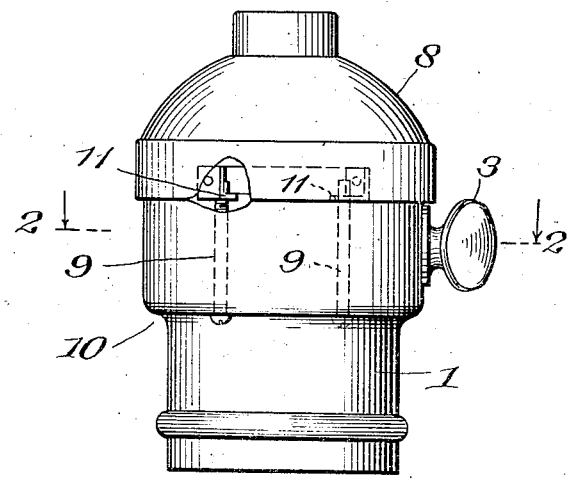
Figure 3:
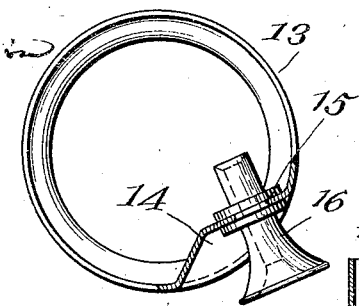
Figure 2:
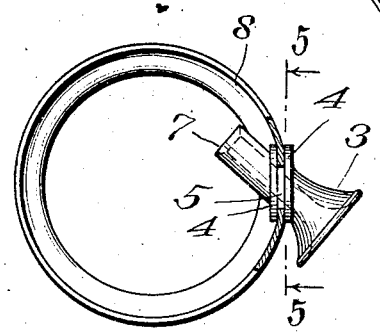
Figure 5:
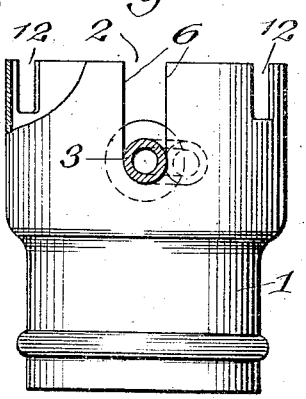
Figure 4:
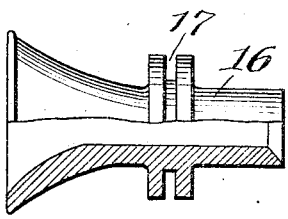

In the accompanying drawings, showing illustrative embodiments of my invention and in which the same reference numerals refer to similar parts in the several figures,—Figure 1 is a side elevation of my improved socket equipped with my chain guide; Fig. 2 is a horizontal section substantially on the line 2—2 of Fig. 1; Fig. 3 is a horizontal section of a modified form of shell, equipped with my attachable and detachable chain guide; Fig. 4 is a side elevation, partly broken away, of one form of my improved chain guide; Fig. 5 is a side elevation of a shell used with my chain guide which is shown in section; Fig. 6 is a side elevation of a socket shell equipped with a modified form of chain guide; Fig. 7 is a horizontal section substantially on the line 7, 7 of Fig. 6; Fig. 8 is a sectional view on the line 8—8 of Fig. 7 looking in the direction of the arrows; Fig. 9 is a plan view of a cheek piece used with this form of removable chain guide; Fig. 10 shows the guide and cheek piece about to be assembled, the cheek piece being shown in section, and the guide in plan; Fig. 11 is a longitudinal section of a modified form of chain guide; Fig. 12 is a horizontal section showing a modified form of cheek piece; Fig. 13 is a perspective view of the cheek piece shown in Fig. 12; Fig. 14 is a side elevation, partly in section, showing my improved chain guide and socket shell used with a husk; Fig. 15 is a detail vertical section showing the preferred form of shell provided with an engaging member to position the socket body with relation to the chain guide.

In the illustrative embodiments of my invention shown in the drawings, 1 is a socket shell provided with a longitudinal slot 2, Fig. 5, for the reception of the removable chain guide or eyelet 3. This removable chain guide or eyelet 3 may be given various forms and contours but is preferably formed from one piece of material and provided with spaced engaging members 4, 4, forming a groove 5, Fig. 2, within which removably fits the walls 6, 6 of the slot 2 of the shell 1, Fig. 5. This groove 5 of the removable chain guide is preferably formed at a slant to the longitudinal axis of the chain guide 3, as shown in Figs. 1 and 2, though it may be formed substantially at right angles to the longitudinal axis, as in Fig. 4. I prefer, however, to form the groove 5 diagonally on the chain guide so as to throw the interior end 7 of the chain guide 3 nearer the interior surface 8 of the shell 1 than would be the case if the groove 5 was formed at right angles to the longitudinal axis of the chain guide. With such a diagonal groove the interior end 7 of the chain guide 3 will be located substantially tangentially to the member carrying the chain or other flexible operating member (not shown) whose end (not shown) is to pass through the interior bore of the chain guide. This type of socket is what is known in the art as a pull socket. While I refer to my removable guide being a chain guide, it is, of course to be understood that I do not limit my invention to a guide for a chain for any suitable flexible operating member may be used to operate the switch mechanism instead of the chain and with which my removable guide will coöperate.

After my improved chain guide 3, with the diagonal slot 5 is assembled by slipping the guide into the socket 2, so that the engaging members 4, 4 will lie on either side of the walls 6, 6 of the shell, the chain guide is held from vertical movement in the slot 2 by means of the cap 8 which coöperates with the guide and the shell to hold the chain guide immovable after it is once assembled.

I preferably secure the cap 8 to the shell 1 by means of screws 9 extending longitudinally of the shell 1 and passing through openings 10 in the shell, their screw threaded ends coöperating with the screw threaded ears 11 immovably carried by the cap 8. The shell 1 is preferably cut away at 12, 12 to receive these ears 11, 11 which in addition to the screws 9, 9 will prevent relative rotation of the cap and shell after they are once assembled.

In some cases I may form a shell 13 with an indented pocket 14, Fig. 3, one wall of which is slotted at 15 for the reception of the removable chain guide 16; the walls of the slot coöperating with the groove 17 which is preferably arranged in this construction, at right angles to the longitudinal axis of the chain guide, Fig. 4.

In some cases I may removably secure the chain guide to the shell by an additional element which is preferably stamped from sheet metal. This form of my invention is shown in Figs. 6 to 10, inclusive, and Figs. 12 and 13. Instead of forming the engaging surfaces 4, 4 directly upon the chain guide, I take an additional piece of material, preferably stamped metal, and form a cheek piece 18, Fig. 9, provided with a central aperture 19 and with two lips 20, 20 which are bent down beneath the main portion of the cheek piece 18 so that they will engage upon the interior surface 8 of the shell 1, Fig. 7, while the main portion of the cheek piece will be on the exterior of the shell, Figs. 6 and 7. In this form of my invention the horn 21 is secured to the cheek piece by inserting its reduced portion 22 within the aperture 19 and then knurling it so that it will be securely held to the cheek piece by means of its shoulder 24 and the knurled portion 23, Fig. 7.

I have shown in Fig. 12 the preferred form of cheek piece 30 provided with a body member 31 having an aperture 32 through which fits the reduced portion 33 of the horn 134, the same being preferably mounted obliquely to the plane of the body member 31, Fig. 12. The horn 134 is secured to the cheek piece 30 in any suitable manner, preferably by upsetting the rim 35 after passing it through the aperture 32. The body member of this cheek piece 30 closes the vertical slot in the shell such as 2 and is removably held in the slot in the shell by the lips 36, 36 being bent down beneath the plane of the body member so that they will engage the interior surface of the shell, the exterior surface being engaged by the tongues 37, 37 on the body members.

In some cases I provide a removable chain guide 25, Fig. 11, with grooves 26 to removably engage the shell 1 and also provide it with a short inwardly extending throat 27, Fig. 11.

My removable chain guide is particularly advantageous when the electric light socket is to be mounted in and surrounded by a husk 28, Fig. 13. In such a construction after the cap 29 has been secured to the fixture 130, the terminals (not shown) carried by the socket body 131 are connected to the feed wires and the chain or other flexible operating member 132 is passed out of the hole 133 in the husk 28. My removable chain guide 34 is then threaded on the chain, or other flexible operating member 32, and inserted through the hole or other opening 133 in the husk, bringing the slot 135 within the husk and in position to coöperate with the walls 136, 136 of the slots 137 in the shell 38 which is then brought into operative position with relation to the cap 29 and secured to it in any suitable manner such as by the longitudinally extending screws 9 when the removable chain guide will be secured from movement by the cap closing the upper portion of the slot 137 in the shell. It will, therefore, be readily seen that my removable chain guide can be readily used with electric light sockets, even when they are surrounded by an ornamental husk 28, and that my removable chain guide can be placed in position after the cap has been located in the husk and the socket wired. After using my removable chain guide with a husk, the socket can be readily disconnected from the husk by reversing the operation of assembling the parts above described, when the removable chain guide can be used on the same socket, or in another similar socket, if desired, the husk being either used or omitted.

In the preferred form of my invention I provide the shell 1 as well as 13 with an engaging arm or arms 40, 40, Fig. 15 to coöperate with a slot or slots 41, 41 in the socket body 131 so that the socket body will be properly positioned with relation to the longitudinal slot 2 in which the chain guide 3 is removably mounted. The engaging arm or arms 40 are preferably made by stamping them out of the body of the shell as shown in Fig. 15, though they, of course, may be otherwise formed.

Having thus described this invention in connection with several illustrative embodiments thereof to the details of which I do not desire to be limited, what is claimed as new and what it is desired to secure by Letters Patent is set forth in the appended claims.

1. In socket shells the combination of a shell, a cap, and rotative means extending longitudinally of the shell for securing the cap and shell together.

2. In socket shells the combination of a cap provided with inwardly extending ears, a shell provided with apertures, screws extending longitudinally of the shell and coöperating with the ears of the cap, to secure the cap and shell together.

3. In electric light pull sockets the combination of a shell provided with a slot, a removable chain guide having means to coöperate with the walls of the slot, a cap to prevent the movement of the chain guide in one direction, and means for securing the cap and shell together.

4. In electric light pull sockets the combination of a shell provided with a slot, a removable chain guide having means to coöperate with the walls of the slot, a cap to prevent the movement of the chain guide in one direction, and means extending longitudinally of the shell for securing the cap and shell together.

5. In electric light fixtures the combination of a husk provided with an opening, a cap for securing the husk in position, a removable chain guide adapted to removably pass through the opening in the husk and removably engage the walls of the slot in the shell, a shell provided with walls to coöperate with the engaging means carried by the removable chain guide, and securing means to hold the shell and cap together.

6. In electric light fixtures the combination of a pull socket, a husk surrounding the pull socket, and a removable chain guide adapted to removably engage the husk and shell of the pull socket.

7. The combination in electric light sockets of a shell provided with an indented pocket having a slot in one of its walls, a removable chain guide mounted in the slot of the pocket, a cap, and means to secure the cap to the shell.

8. In electric light pull sockets the combination of a shell provided with a slot, a removable chain guide mounted in the slot, a socket body, means to accurately position the socket body in the shell with relation to the slot for the removable chain guide, and a cap to secure the chain guide from movement in one direction.

9. In electric light pull sockets the combination of a shell provided with a slot and an inwardly extending arm or arms, a socket body provided with a groove or grooves to coöperate with the arm or arms carried by the shell, a removable chain guide mounted in the slot, and a cap to prevent movement of the chain guide in one direction.

10. A pull socket comprising a shell body having a slot in its upper end, a double flanged eyelet detachably carried by said shell in said slot forming a chain guide and having its flanges overlapping the edges of the body surrounding the slot and a shell cap on the body holding the eyelet in place.

11. In a pull socket, a metallic shell-body having a slot, a chain guide having a groove removably fitting the edges of the metal around the slot and a shell-cap fitting the edge of the body and holding the chain guide in place.

TONJES AUGUST CARL BOTH.

Witnesses:
LEON STRAUSS,
C. D. BUSH.

Copies of this patent may be obtained for five cents each, by addressing the "Commissioner of Patents, Washington, D. C."